(12) United States Patent
Kim et al.

(10) Patent No.: US 10,278,120 B2
(45) Date of Patent: Apr. 30, 2019

(54) METHOD FOR CONTROLLING SMALL CELL AND APPARATUS FOR SAME

(71) Applicant: INDUSTRY-UNIVERSITY COOPERATION FOUNDATION HANYANG UNIVERSITY, Seoul (KR)

(72) Inventors: Sun Woo Kim, Seoul (KR); Sang Woo Lee, Yongin (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 15/112,142

(22) PCT Filed: Jan. 14, 2015

(86) PCT No.: PCT/KR2015/000373
§ 371 (c)(1),
(2) Date: Jul. 15, 2016

(87) PCT Pub. No.: WO2015/108329
PCT Pub. Date: Jul. 23, 2015

(65) Prior Publication Data
US 2016/0345247 A1    Nov. 24, 2016

(30) Foreign Application Priority Data

Jan. 16, 2014   (KR) ........................ 10-2014-0005618
Jan. 21, 2014   (KR) ........................ 10-2014-0007272
(Continued)

(51) Int. Cl.
*H04W 48/16*   (2009.01)
*H04W 56/00*   (2009.01)
(Continued)

(52) U.S. Cl.
CPC ............... *H04W 48/16* (2013.01); *H04L 1/08* (2013.01); *H04L 5/0053* (2013.01);
(Continued)

(58) Field of Classification Search
CPC ..................................................... H04W 48/16
See application file for complete search history.

(56) References Cited

U.S. PATENT DOCUMENTS

2011/0039499 A1   2/2011   Zhang et al.
2013/0194947 A1   8/2013   Ehsan et al.
(Continued)

FOREIGN PATENT DOCUMENTS

JP   P2012-514361 A   6/2012
KR   10-2011-0059529 A   6/2011
(Continued)

OTHER PUBLICATIONS

International Search Report for International Patent Application No. PCT/KR2015/000373 filed Jan. 14, 2015.
(Continued)

*Primary Examiner* — John D Blanton

(57) ABSTRACT

The present invention relates to a method and an apparatus for controlling the operation of a small cell in an environment in which small cells are deployed. More specifically, disclosed are a method and an apparatus for controlling the transmission of a discovery signal with which a small cell can broadcast the presence of the small cell while in an off state, and for controlling the small cell to reduce the small cell on/off time. Particularly, provided are an apparatus and a method for a base station to change the state, the method comprising the steps of: transmitting a discovery signal while in a deactivated state; receiving a state change instruction signal for changing from the deactivated state to an
(Continued)

activated state; and changing to the activated state on the basis of the state change instruction signal.

2 Claims, 14 Drawing Sheets

(30) Foreign Application Priority Data

| Mar. 24, 2014 | (KR) | .................. | 10-2014-0034126 |
| Dec. 10, 2014 | (KR) | .................. | 10-2014-0177482 |
| Dec. 10, 2014 | (KR) | .................. | 10-2014-0177488 |

(51) Int. Cl.
*H04W 74/08* (2009.01)
*H04L 1/08* (2006.01)
*H04L 5/00* (2006.01)
H04W 88/08 (2009.01)
H04W 88/02 (2009.01)
H04W 88/10 (2009.01)
H04W 48/12 (2009.01)
H04L 1/00 (2006.01)

(52) U.S. Cl.
CPC ..... *H04W 56/001* (2013.01); *H04W 74/0833* (2013.01); *H04L 1/0045* (2013.01); *H04L 5/0023* (2013.01); *H04L 5/0035* (2013.01); *H04L 5/0094* (2013.01); *H04W 48/12* (2013.01); *H04W 88/02* (2013.01); *H04W 88/08* (2013.01); *H04W 88/10* (2013.01); *Y02D 70/12* (2018.01); *Y02D 70/126* (2018.01); *Y02D 70/20* (2018.01)

(56) References Cited

U.S. PATENT DOCUMENTS

| 2015/0351020 | A1* | 12/2015 | Lin ........................ | H04W 8/005 |
| | | | | 455/404.1 |
| 2016/0073273 | A1* | 3/2016 | Li ........................... | H04W 24/10 |
| | | | | 455/449 |
| 2016/0205705 | A1* | 7/2016 | Chen ................... | H04W 74/0833 |
| | | | | 370/328 |
| 2016/0212647 | A1* | 7/2016 | Mo ........................ | H04W 48/12 |
| 2016/0242020 | A1* | 8/2016 | Xu ...................... | H04W 52/0206 |
| 2016/0255583 | A1* | 9/2016 | Takeda ............... | H04W 74/0833 |
| | | | | 370/311 |
| 2016/0374119 | A1* | 12/2016 | Choi ..................... | H04W 76/02 |
| 2017/0111884 | A1* | 4/2017 | Sadeghi ................ | H04W 68/02 |

FOREIGN PATENT DOCUMENTS

| KR | 10-2011-0072695 A | 6/2011 |
| KR | 10-2011-0093648 A | 8/2011 |
| KR | 10-2013-0049132 A | 5/2013 |

OTHER PUBLICATIONS

Alcatel-Lucent et al., R1-135156, Considerations for (E)PDCCH in coverage enhancement, 3GPP TSG RAN WG1 #75, 3GPP.

* cited by examiner

METHOD FOR CONTROLLING SMALL CELL AND APPARATUS FOR SAME

TECHNICAL FIELD

The present invention relates to a method and an apparatus for controlling an operation of a small cell in an environment in which small cells are deployed. More specifically, the present invention relates to a method and an apparatus for controlling the transmission of a discovery signal with which a small cell is capable of broadcasting the presence of the small cell in an off state, and for controlling the small cell to reduce small cell on/off time.

BACKGROUND ART

The advancement of communication systems allows users, including companies and individuals, to use a wide variety of wireless terminals.

In current 3rd Generation Partnership Project (3GPP) mobile communication systems, such as Long-Term Evolution (LTE) and LTE-Advanced systems, high-speed and high-capacity communication systems that are capable of transmitting and receiving a variety of data including video and wireless data, departing from voice-oriented services, are required.

For high-speed and high-capacity communication systems, there is required technology for increasing the capacity of a terminal using a small cell.

Particularly, in a dense environment of a plurality of terminals, a plurality of small cells may be deployed in adjacent areas in order to satisfy demands of the terminals for data. In this environment, a base station that provides a specific small cell may have an activation or deactivation function in order to prevent power consumption and to minimize signal interference. Thus, a specific method is needed for a terminal to recognize whether the base station that provides the small cell is activated or deactivated.

Further, when the small cell is frequently activated or deactivated, if the time to change the state of the small cell relatively increases, the communication efficiency of the terminal may be reduced.

DETAILED DESCRIPTION OF THE INVENTION

Technical Problem

Therefore, the present invention has been made in view of the above-mentioned problems, and an aspect of the present invention is to provide a method and an apparatus for transmitting and receiving a discovery signal from a small cell so that a terminal quickly retrieves the small cell even when the small cell is in a deactivated state.

Further, another aspect of the present invention is to provide a method and an apparatus for reducing the time for a base station providing a small cell to change a state, when the base station frequently changes between an activated state and a deactivated state, and for quickly performing synchronization.

Technical Solution

In accordance with an aspect of the present invention, there is provided a method of changing a state by a base station, the method including: transmitting a discovery signal in a deactivated state; receiving a state change instruction signal to change the deactivated state to an activated state; and changing to the activated state based on the state change instruction signal.

In accordance with another aspect of the present invention, there is provided a method of changing an activation state of a base station by a terminal, the method including: receiving a discovery signal from the base station in a deactivated state; transmitting a state change instruction signal to change the deactivated state to an activated state; and performing a random access procedure with the base station in the activated state.

In accordance with another aspect of the present invention, there is provided a base station that changes a state, the base station including: a transmitter configured to transmit a discovery signal in a deactivated state; a receiver configured to receive a state change instruction signal to change the deactivated state to an activated state; and a controller configured to change to the activated state based on the state change instruction signal.

In accordance with another aspect of the present invention, there is provided a terminal that changes an activation state of a base station, the terminal including: a receiver configured to receive a discovery signal from the base station in a deactivated state; a transmitter configured to transmit a state change instruction signal to change the deactivated state to an activated state; and a controller configured to perform a random access procedure with the base station in the activated state.

Advantageous Effects

As described above, the present invention provides a method and an apparatus for transmitting and receiving a discovery signal from a small cell so that a terminal quickly retrieves the small cell even when the small cell is in a deactivated state, thereby allowing the terminal to quickly identify the presence of the small cell even though the small cell is in the deactivated state.

Further, the present invention provides an effect of reducing the time for a base station providing a small cell to change a state, when the base station frequently changes between an activated state and a deactivated state, and an effect of quickly performing synchronization.

MODE FOR CARRYING OUT THE INVENTION

Figure 1:
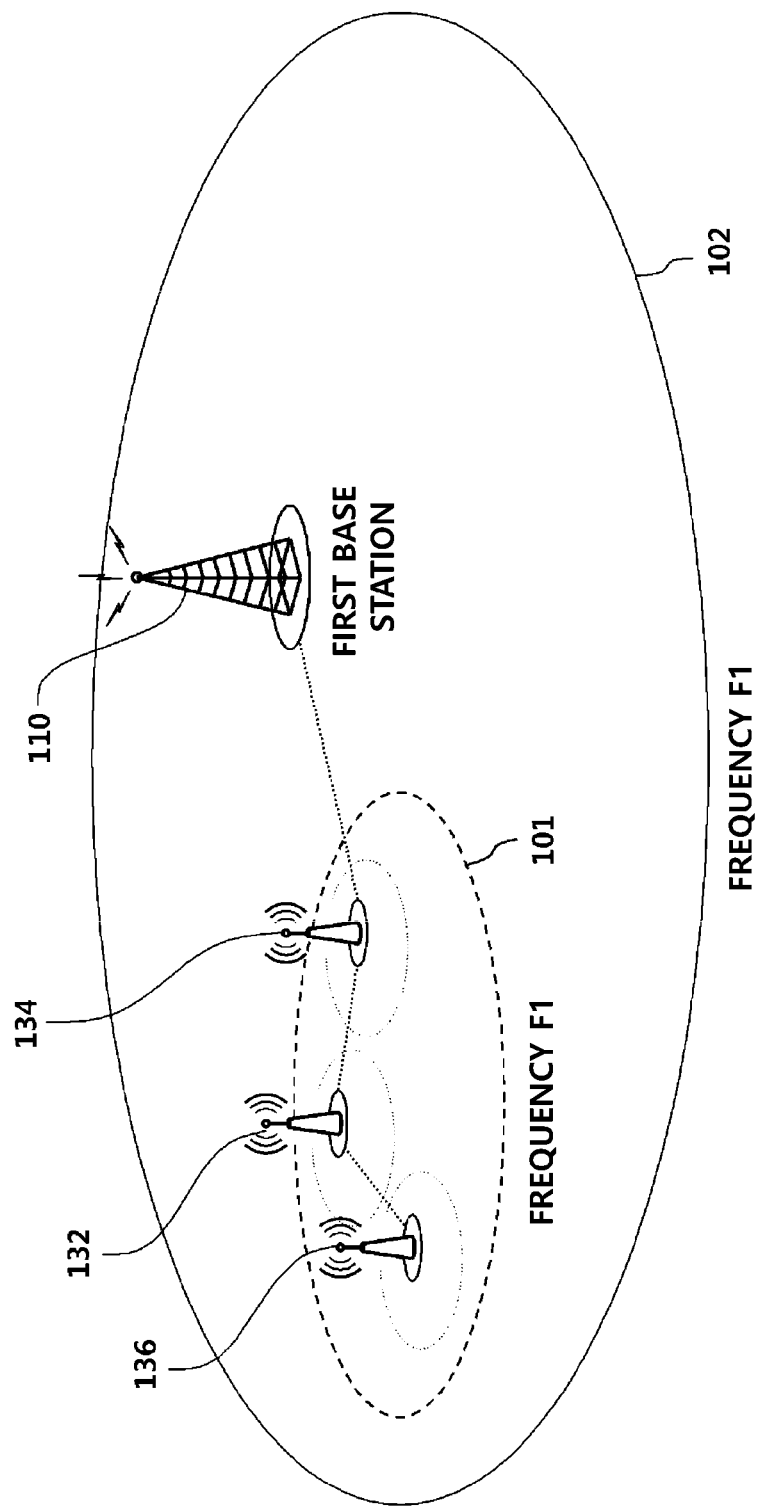
FIG. 1 illustrates an example of a network configuration to which the present invention is applicable.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in WCDMA, LTE, HSPA, and the like, and an MS (Mobile station), a UT (User Terminal), an SS (Subscriber Station), a wireless device, and the like in GSM.

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station 20 or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. i) The base station may be a device itself that provides a mega cell, a macro cell, a micro cell, a pico cell, a femto cell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a mega cell, a macro cell, a micro cell, a pico cell, a femto cell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present invention may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present invention may not be limited to a specific wireless communication field, and may include all technical fields in which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In this specification, a cell may refer to a component carrier, which has the coverage of a signal transmitted by a transmission/reception point or that of a signal transmitted by a transmission point or the transmission/reception point, and the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, an EPDCCH, a PDSCH, or the like may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" includes an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present invention, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

In the present specification, on the basis of the coverage radius of a cell provided by a base station, a cell having relatively larger coverage is referred to as a macro cell, and a cell having relatively smaller coverage is referred to as a small cell.

Figure 2:
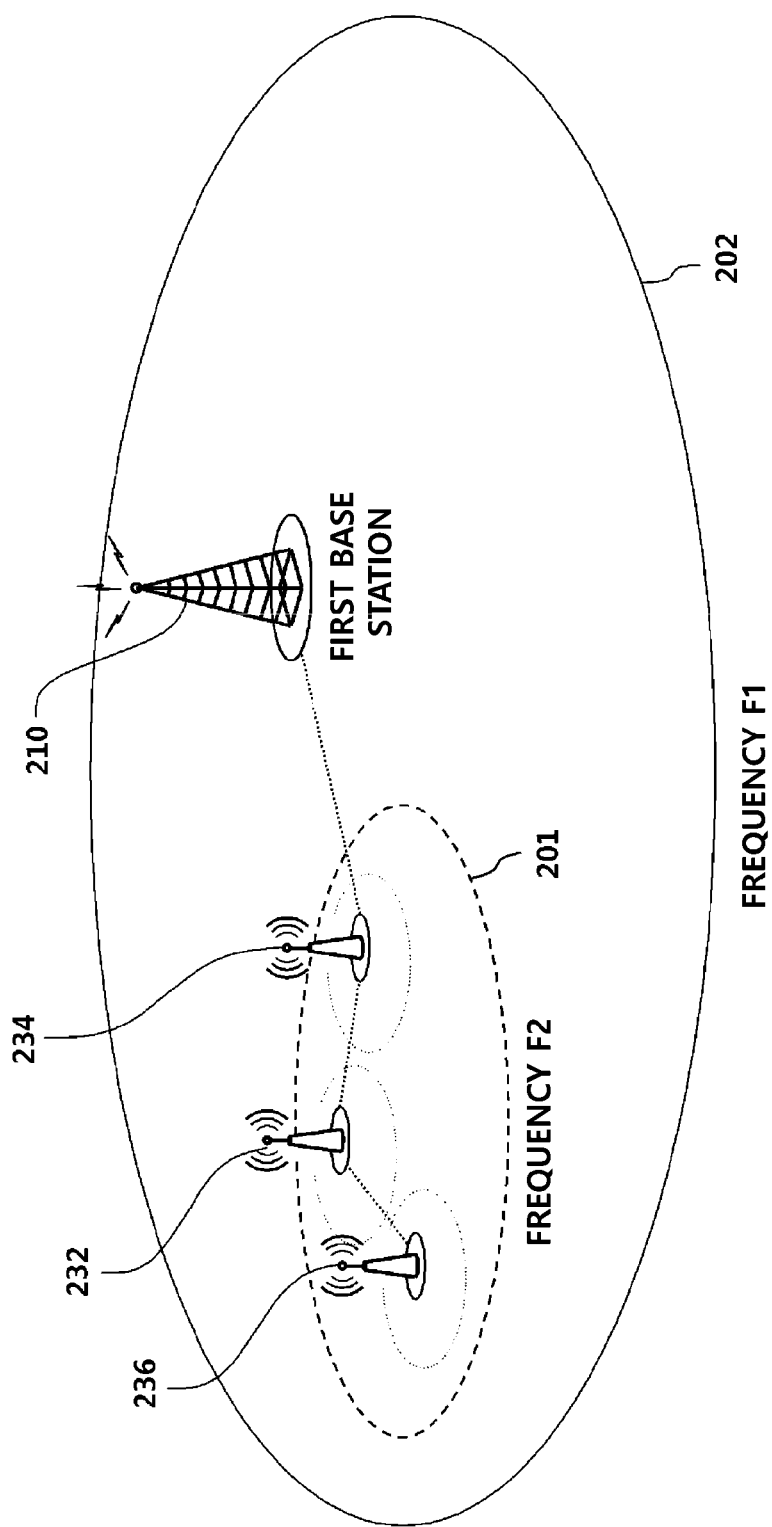
FIG. 2 illustrates another example of a network configuration to which the present invention is applicable.
Figure 3:
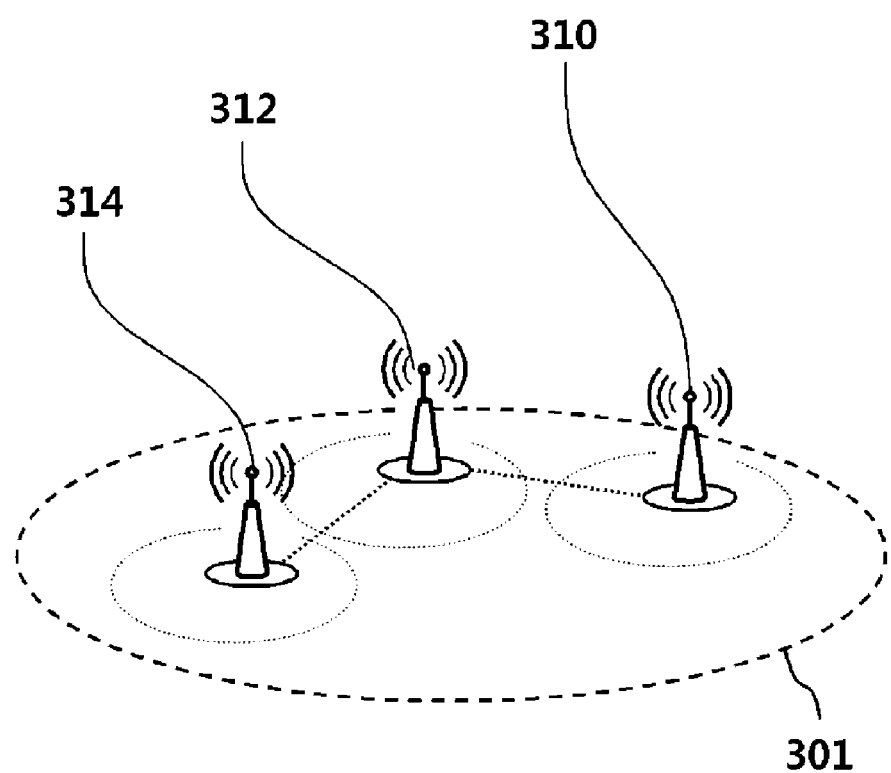
FIG. 3 illustrates still another example of a network configuration to which the present invention is applicable.

For example, a small cell may be formed to overlap with, or to be separate from, a macro cell, which may be formed as in scenarios illustrated in FIGS. 1 to 3. In the present specification, a small cell or macro cell may denote a cell provided by each base station or may denote a base station providing each cell. That is, a small cell may denote a cell provided by a small-cell base station or may denote a small-cell base station providing a small cell depending on the context. Further, in the present specification, a macro-cell base station may be referred to as a first base station or NodeB, and a small-cell base station may be referred to as a second base station or HNodeB.

FIG. 1 illustrates an example of a network configuration to which the present invention is applicable.

Referring to FIG. 1, a macro cell 102 and small cells 101 have the same carrier frequency F1, and a first base station 110 and second base stations 132, 134, and 136 are connected through a non-ideal backhaul. The small cells may be established to be overlaid with the coverage of the macro cell. An outdoor small-cell environment and a small-cell cluster are considered.

FIG. 2 illustrates another example of a network configuration to which the present invention is applicable.

As illustrated in FIG. 2, a macro cell 102 and small cells 201 have different carrier frequencies F1 and F2, and a first base station 210 and second base stations 232, 234, and 236 are connected through a non-ideal backhaul. The small cells may be established to be overlaid with the coverage of the macro cell. An outdoor small-cell environment, an indoor small-cell environment, and a small-cell cluster are considered.

FIG. 3 illustrates still another example of a network configuration to which the present invention is applicable.

Referring to FIG. 3, there are only small cells having only one or more carrier frequencies F1 or F2, and second base stations 310, 312, and 314 providing the small cells are connected through a non-ideal backhaul. An indoor small-cell environment and a small-cell cluster are considered.

That is, as illustrated in FIGS. 1 and 2, a terminal may be dually connected to the macro cell and a small cell to perform communication. Further, as illustrated in FIG. 3, a terminal may be dually connected to a plurality of small cells to perform communication.

In the scenarios of FIGS. 1 to 3, the second base stations may each operate as stand-along base stations. That is, for control-plane data transmission, the terminal may establish one Radio Resource Control (RRC) connection with a second base station and may establish one or more Signaling Radio Bearers (SRBs). For user-plane data transmission, the terminal may have one or more Data Radio Bearers (DRBs) with the second base stations.

In the scenarios of FIGS. 1 to 3, the terminal may transmit user-plane data through one or more second base stations (or through cooperation between the first base station and one or more second base stations) under control by the first base station. Alternatively, the terminal may transmit user-plane data through cooperation between second base stations (small-cell base stations).

That is, for control-plane data transmission, the terminal establishes one RRC connection with the first base station in FIG. 1 or 2 or a second base station (small-cell base station) in FIG. 3 and may establish one or more SRBs to be transmitted through the first base station or through the first base station and the second base station. Further, for user-plane data transmission, the terminal may configure one or more DRBs through the first base station in FIG. 1 or FIG. 2 or through a second base station (small-cell base station) in FIG. 3. Alternatively, for user-plane data transmission, the terminal may configure one or more DRBs through the first base station and the second base station.

The present invention illustrates a method and an apparatus for controlling an HnodeB that is applicable to the scenarios illustrated above in FIGS. 1 to 3, where small cells are deployed.

A small cell forms relatively smaller coverage than a macro cell. Thus, when a specific macro cell is crowded with a plurality of terminals to make it difficult to perform communication, the terminals may perform communication through a small cell.

Here, a small cell may overlap in terms of coverage with a macro cell or another small cell, in which case an interference signal may occur. Further, when there are few terminals in the coverage, unnecessary power may be used since the coverage overlaps with the coverage of the macro cell.

To solve the foregoing problems, the small cell may switch between an activated state and a deactivated state. In the activated state (on state), the small cell may communicate with a terminal according to a general procedure. In the deactivated state (off state), however, the small cell generates only a discovery signal at a minimum and does not communicate with a terminal, thus reducing power consumption and occurrence of an interference signal.

That is, in the deactivated state, an HnodeB periodically transmits only a discovery signal so that a terminal recognizes the presence of the HnodeB. The terminal determines whether the discovery signal is detected to identify the presence of the HnodeB, and may perform communication using the HnodeB when the HnodeB switches to the activated state.

Hereinafter, a method and an apparatus that enables a terminal to identify the presence of an HnodeB in the deactivated state will be described.

Retrieval of Small-Cell Base Station

For conventional mobile communication systems, there are proposed cell retrieval methods based on Mobility State Estimation (MSE) of a wireless terminal and fingerprinting using the Reference Signal Received Power (RSRP)/Reference Signal Received Quality (RSRQ) of a reference signal.

Specifically, a conventional small cell retrieval method relates to a method in which a wireless terminal uses a reference signal (primary synchronization signal (PSS), secondary synchronization signal (SSS), and cell-specific reference signal (CSR)) transmitted by an HNodeB, which retrieves a cell based on MSE of the wireless terminal or a fingerprinting method using the RSRP of the reference signal.

This method involves great overheads and energy consumption due to the feedback of received information by the wireless terminal and may not be used in the absence of a database of the RSRPs of reference signals at different positions recorded in advance. Further, positioning accuracy is reduced due to the difference between measurement time slots (between a database measurement time slot and a cell retrieval time slot) and the difference between the kinds of wireless terminals (a device used to record the database and a device performing cell retrieval), resulting in excessive energy consumption by an unnecessary cell retrieval. Moreover, in the cell retrieval using the reference signal (PSS, SSS, and CRS), interference between adjacent frequencies and interference between adjacent cells may restrict cell retrieval.

To solve such problems, the present invention includes a small cell retrieval method of a wireless terminal (user equipment (UE)) that receives a positioning reference signal (PRS), which is periodically transmitted by an HNodeB, in a mobile communication system and a small cell management method for minimizing unnecessary energy consumption and interference between channels.

The present invention proposes a method in which an HNodeB periodically transmits a PRS so that a wireless terminal retrieves a small cell and an NodeB efficiently manages the small cell according to a retrieval result.

In the present invention, a NodeB assigns each HNodeB located in the NodeB coverage a time, a frequency, and a code to maintain orthogonality between PRSs so as to minimize interference between PRSs of the NodeB and an adjacent HNodeB. Assigning the times, frequencies, and codes enables a reduction in interference between PRSs, that is, reference signals for cell retrieval, thereby allowing a more effective small cell retrieval. Further, the NodeB reports PRS information on all small cells to a wireless terminal located in the NodeB coverage so that the wireless terminal may retrieve a small cell.

The wireless terminal reports a small cell retrieval result back to the NodeB, and the NodeB switches the state of a corresponding HNodeB from a deactivated (standby/off) mode into an activated (on) mode, thereby allowing the wireless terminal to perform data communication through the HNodeB. When the wireless terminal is not located in the coverage of the small cell, the HNodeB maintains the standby mode to reduce interference between adjacent cells and unnecessary energy consumption.

A detailed description is made in each embodiment.

A base station of each cell transmits a PRS formed of a unique code thereof. However, when the base station transmits a PRS having the same time-frequency pattern and periodicity as those of an adjacent cell, interference may occur, making it difficult to detect the PRS and to retrieve a cell. Interference between PRSs may be avoided by changing the pattern and periodicity of a PRS for each cell. The pattern and periodicity of a PRS are determined through a cell unique identifier (ID) and configuration index.

Figure 4:
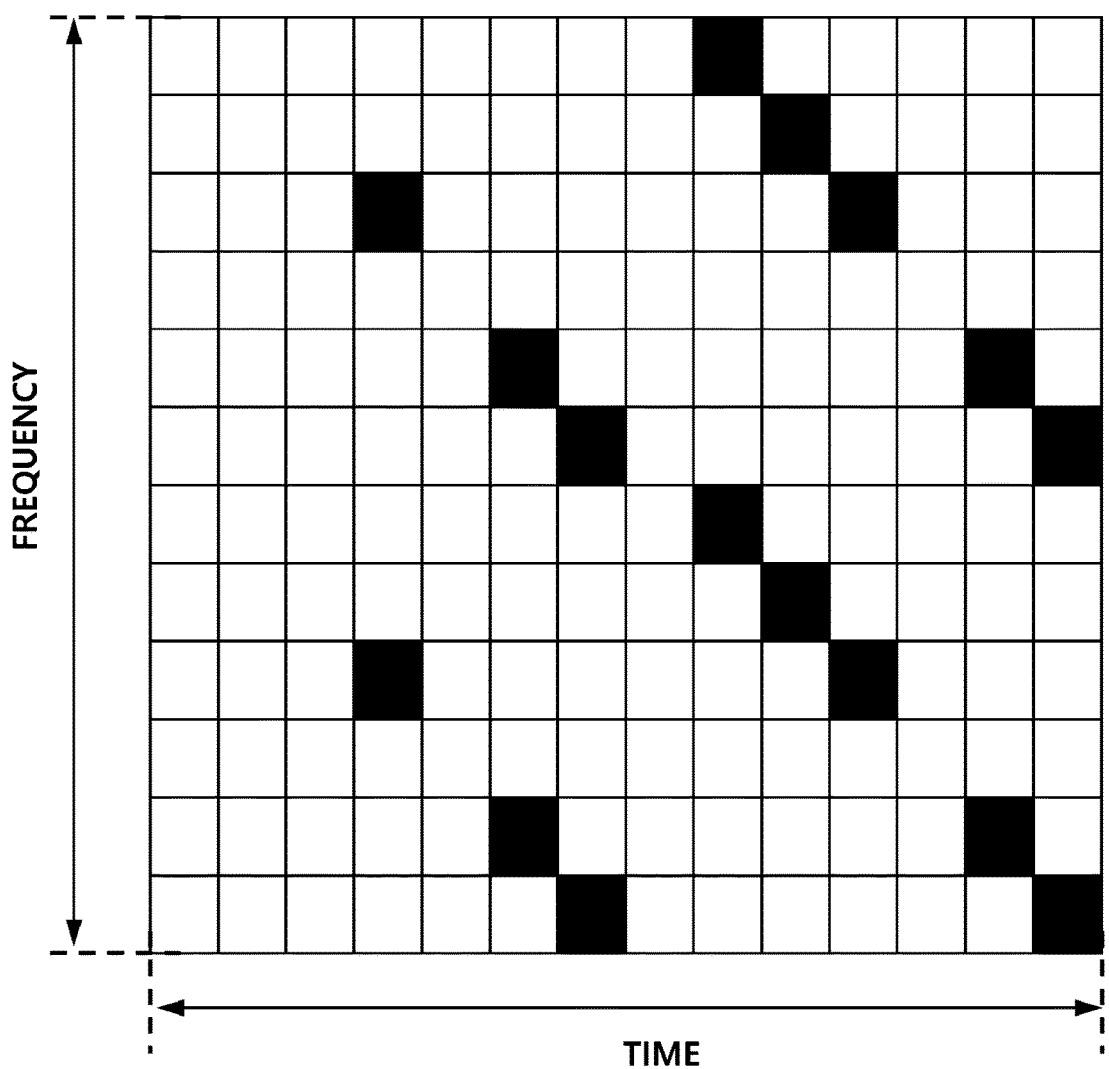
FIG. 4 illustrates an example of a positioning reference signal (PRS) time-frequency pattern.

FIG. 4 illustrates an example of a PRS time-frequency pattern.

Specifically, for example, FIG. 4 shows a PRS pattern defined in a standard (for example, the 3GPP standard), which is a PRS pattern given when a remainder in division of a cell ID by 6 is 0.

Figure 5:
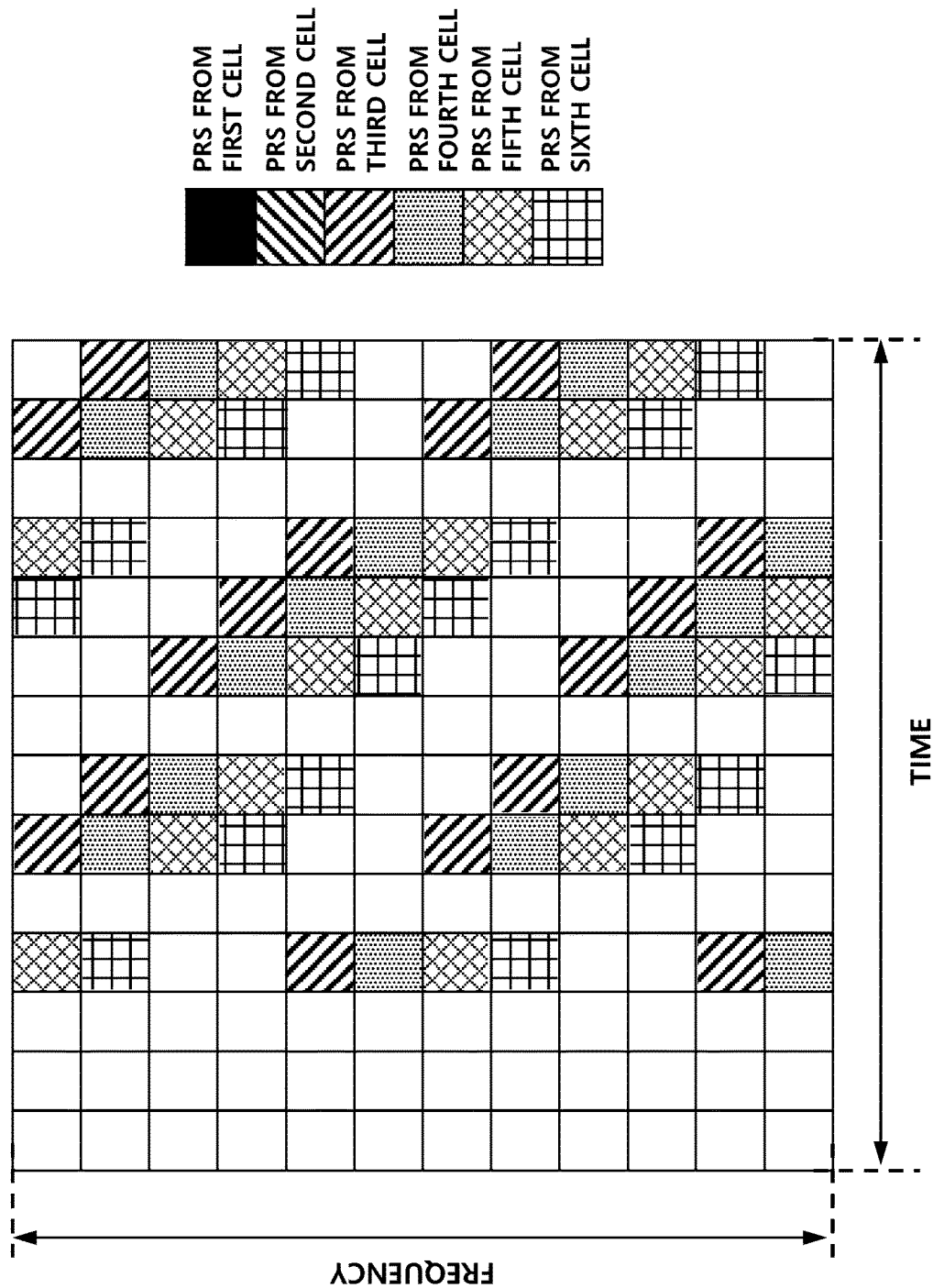
FIG. 5 illustrates an example of PRS time-frequency orthogonal patterns of a plurality of cells.

FIG. 5 illustrates an example of PRS time-frequency orthogonal patterns of a plurality of cells.

Referring to FIG. 5, due to different cell IDs, six different frequency-time patterns in total may be obtained. Thus, when interference between adjacent frequencies is disregarded, six PRSs in total may simultaneously be transmitted without interference.

In a small-cell environment, unlike in a conventional macro-cell environment, a small area is crowded with a large number of small cells, and thus using only the six patterns may restrict small cell retrieval due to interference between adjacent cells. Thus, for small cell retrieval using a PRS, it is necessary to assign cells IDs and configuration indexes so as to minimize interference between PRSs of adjacent small cells.

The present invention proposes a method of assigning a small cell ID and configuration index according to overlapping coverage of adjacent small cells in order to minimize interference between PRSs of small cells in a case where an NodeB (eNodeB) recognizes the coverage of each small cell through the positions and transmits power of all HNodeBs located in the NodeB coverage or through a network administrator.

The present invention follows operations below. Each operation may be divided into one or more operations, different operations may be performed in combination, or some operations may be omitted. All the cases may be included in specific embodiments of the present invention.

Figure 6:
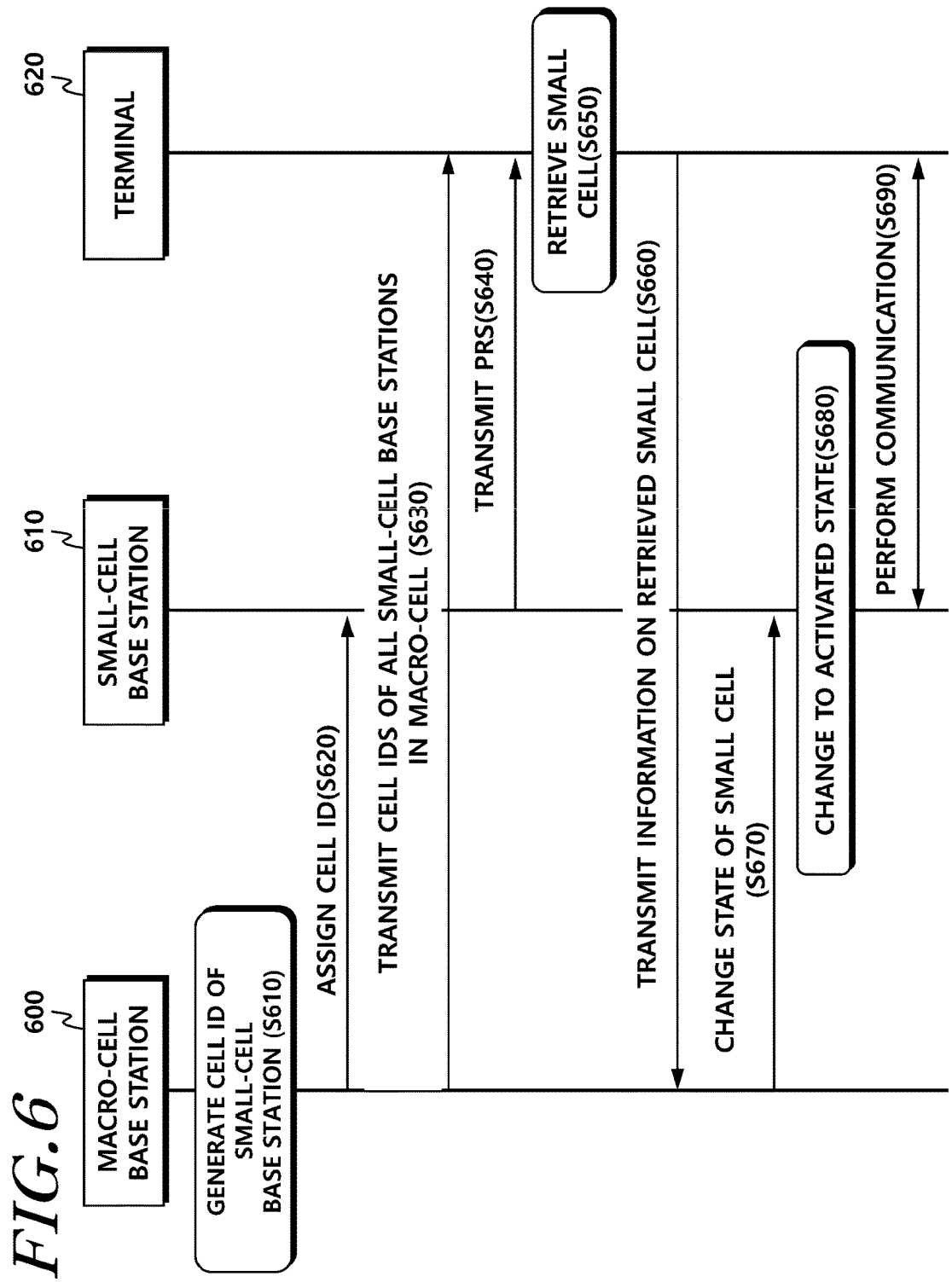
FIG. 6 illustrates a small cell retrieval process using a PRS according to an embodiment of the present invention.

FIG. 6 illustrates a small cell retrieval process using a PRS according to an embodiment of the present invention.

The operations of the present invention are described in order with reference to FIG. 6.

1) Operation 1: Operation of Assigning PRSs for Small Cells

First, a NodeB 600 forms a cluster of adjacent small cells and generates cell IDs for six HNodeBs 610, which are located in small cells of the cluster, of which coverages overlap to the greatest extent, to have different time-frequency patterns (S610). The NodeB 600 assigns the generated cell IDs to the respective HNodeBs 610 (S620). The NodeB 600 assigns different configuration indexes for other small cells to have different periodicities and subframe offsets from those of PRSs of the six small cells.

Also, the cell IDs are assigned such that PRS unique codes have maximum orthogonality (S620). When there is a plurality of small cells in one cluster, the cluster is divided into sub-clusters and the total number of resource blocks is divided by the number of sub-clusters so that each sub-cluster transmits a PRS using a different resource block.

2) Operation 2: Operation of Transmitting PRS Information on all HNodeBs 610 Located in Macro-Cell Coverage to Wireless Terminal 620 (S630)

The wireless terminal 620 needs to know PRS pattern information (small cell ID and configuration index) in order to retrieve a small cell using a PRS. The NodeB 600 reports PRS information used by all HNodeBs 620 to the wireless terminal 620 in the macro-cell coverage so that the wireless terminal 620 may retrieve a small cell.

3) Operation 3: Operation of Retrieving Small Cell Using PRS

The wireless terminal 620 retrieves a surrounding small cell using the PRS information on the small cells received from the NodeB 600 (S650). Here, the HNodeBs 610 transmit a PRS using the assigned cell IDs (S640). The terminal 620 reports, to the NodeB 600, an ID of a small cell transmitting a PRS with the best RSRP and RSRQ among the PRSs received during the small cell retrieval process (S660).

4) Operation 4: Operation of Performing Data Communication Through Small Cell

The NodeB 600 changes the state of a corresponding HNodeB 610 from the deactivated state (standby mode) to the activated state (transmission mode) according to a small cell retrieval result from the wireless terminal 620 (S670). Specifically, the NodeB 600 transmits a state change signal to the HNodeB 610 (F670). The state change signal may be transmitted through an interface between the base stations. The HNodeB 610 changes the state to the activated state based on the state change signal from the macro cell (S680). As the small cell changes the state, the wireless terminal 620 performs data communication with the HNodeB 610 (S690). When the wireless terminal departs from the small cell, the HNodeB changes the state back to the deactivated state to reduce unnecessary energy consumption and interference with an adjacent small cell or interference with the macro cell.

5) Operation 5: Operation of Positioning Wireless Terminal Using PRS

In addition, the wireless terminal may use a PRS not only to retrieve a small cell but also to estimate a distance from an HNodeB. Accordingly, the wireless terminal may detect the position thereof using PRS-based distance estimation.

For example, a process of retrieving a small cell using a PRS is illustrated as follows.

A conventional cell retrieval method may use moving state information on a wireless terminal or compare the strength or quality of a received signal of the wireless terminal with values in a database to determine whether to retrieve a cell and time to retrieve a cell based on a comparison result. However, when there is no database or information recorded in the database has a low validity, unnecessary cell retrieval may be performed due to interference between adjacent frequencies or adjacent cells, thus causing an increase in energy consumption of the wireless terminal.

In the present invention, a wireless terminal measures the RSRP or RSRQ of a received PRS and performs cell retrieval based on the RSRP or RSRQ, thereby efficiently performing cell retrieval and reducing energy consumption even in the absence of a database. A PRS uses a higher frequency reuse factor than a reference signal (PSS, SSS, and CRS) used for the conventional cell retrieval and may be subjected to an inter-cell interference coordination scheme to receive less effect of interference between adjacent frequencies or adjacent cells than the PSS, SSS, and CRS, thus enabling a more efficient cell retrieval.

To this end, an HNodeB periodically transmits a PRS. When the RSRP or RSRQ of the received PRS is a threshold or higher, the wireless terminal performs cell retrieval. When the RSRP or RSRQ of the received PRS is less than the threshold, the wireless terminal does not perform cell retrieval.

Figure 7:
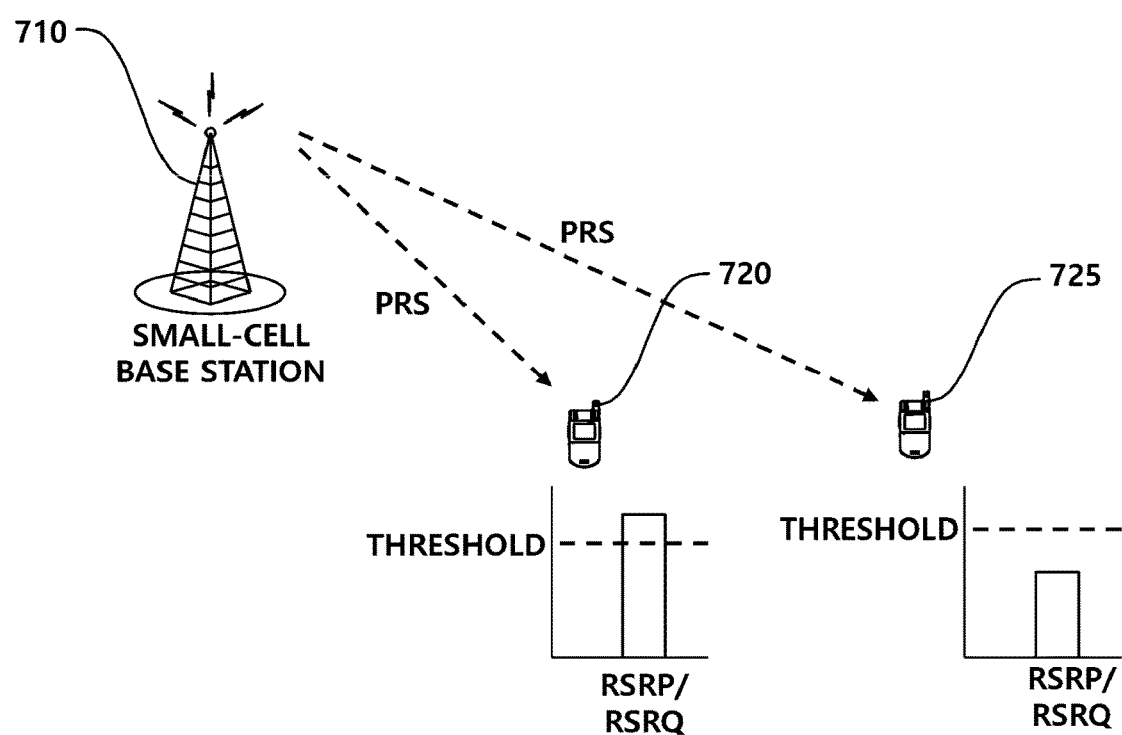
FIG. 7 illustrates a process of performing cell retrieval according to the distance between a wireless terminal and a small-cell base station.

FIG. 7 illustrates a process of performing cell retrieval according to the distance between a wireless terminal and an HNodeB.

FIG. 7 illustrates an example in which a wireless terminal (UE) performs cell retrieval based on the RSRP or RSRQ of a received PRS from the HNodeB to. A wireless terminal 720 positioned at P1 receives a PRS with RSRP or RSRQ that is a threshold or higher and performs small cell retrieval. However, a wireless terminal 725 positioned at P2 receives a PRS with RSRP or RSRQ that is less than the threshold and does not perform small cell retrieval.

The present invention allows a wireless terminal to efficiently perform small cell retrieval and to reduce energy consumption. Further, the wireless terminal may estimate a distance to an HNodeB using a PRS, thus estimating the position of the wireless terminal using the distance.

To summarize, a NodeB (eNodeB) assigns a small cell ID and configuration index to each small cell located in the coverage of the eNodeB in view of the position and coverage of the small cell to have minimum interference and reports the small cell ID and configuration index to each HNodeB. Subsequently, the eNodeB reports PRS information on each small cell to a wireless terminal that accesses a macro cell so that the wireless terminal may perform small cell retrieval using a PRS. Further, when the wireless terminal becomes adjacent to an HNodeB and retrieves a small cell through the reception of a PRS from the HNodeB, the wireless terminal reports to the eNodeB that the wireless terminal is in the coverage of the HNodeB, and accordingly the eNodeB changes the state of the HNodeB into the activated mode to allow the wireless terminal to perform data communication through the HNodeB.

Specifically, for example, the present invention may provide a method for retrieving and managing a small cell using a PRS in a mobile communication system. The method for retrieving and managing the small cell includes: assigning, by a NodeB (eNodeB), a PRS pattern (small cell ID and configuration index) of an HNodeB located in the coverage of the eNodeB; reporting PRS information on the eNodeB to a wireless terminal; retrieving, by the wireless terminal, a small cell using the PRS information; and performing data communication between the wireless terminal and the HNodeB through a change in the state of the HNodeB according to a result of retrieving the small cell.

Further, assigning a time, a frequency, and a code for a PRS may include assigning the time, the frequency, and the code for the PRS to minimize interference with an adjacent small cell and interference with the macro cell in view of the position and coverage of the HNodeB.

Further, retrieving the small cell using the PRS may report, to the eNodeB, an ID of a small cell transmitting a PRS with the best RSRP and RSRQ among PRSs received by the wireless terminal.

Further, performing the data communication through the small cell may enable communication between the wireless terminal and the HNodeB by the eNodeB changing the state of the HNodeB from the standby mode to the transmission mode according to the result of retrieving the small cell.

The present invention described above may allow a wireless terminal to effectively retrieve and manage a small cell and to reduce energy consumption. Further, the wireless terminal may estimate a relatively accurate distance to an HNodeB using a PRS, thus enabling the position of the wireless terminal to be estimated using the small cell.

As described above, a terminal and a base station according to the embodiment of the present invention may retrieve an HNodeB using a PRS signal and may change the state of the HNodeB to perform communication. Accordingly, the HNodeB may reduce an interference signal and save power consumption.

Hereinafter, there is proposed a method for reducing state change time in changing the state of an HNodeB according to another embodiment of the present invention.

Method for Reducing Time to Change State of Small-Cell Base Station

Among the foregoing techniques to which the present invention is applicable, carrier aggregation and a small cell technique are briefly described.

Carrier aggregation is a technique of using different frequency bands at the same time for communication. Carrier aggregation is required in LTE-Advanced, in which a carrier defined in LTE is defined as a component carrier (CC) and aggregated component carriers are used at the same time. Carrier aggregation allows a terminal to communicate with a plurality of cells or base stations using a plurality of carriers at the same time.

A small cell refers to a cell having relatively smaller coverage than a macro cell provided by a conventional base station. Since a small area may be crowded with a large number of terminals or an increasing amount of data may be transmitted and received in a specific area, the deployment of small-cell base stations is considered to deal with such cases.

Further, a base station providing a macro cell and a base station providing a small cell each may provide a terminal with one or more cells, using the carrier aggregation and the small cell technique. The terminal may establish dual connectivity to the base station providing the macro cell and the base station providing the small cell through the plurality of provided cells. In dual connectivity, when the terminal is connected to a plurality of base stations to perform communication, a specific radio bearer is configured to be split for the plurality of base stations.

Meanwhile, as described above, an HNodeB transmits a discovery signal in the deactivated state, and the terminal receives the discovery signal to recognize the HNodeB. Although a PRS has been illustrated above as the discovery signal, the discovery signal may be formed of at least one or more of a PSS, SSS, CRS, and CSI-RS.

Hereinafter, a method and an apparatus for setting an HNodeB in the deactivated state and setting the HNodeB in the activated state if necessary are described. That is, a procedure in which a terminal recognizes whether a small cell is activated or deactivated to perform communication using the small cell is illustrated in detail.

As described above, the terminal needs to recognize whether an HNodeB is activated state or deactivated. If an HNodeB is present and is activated, the terminal may use the HNodeB to reduce the load of a NodeB.

A method for a terminal to identify whether an HNodeB or small cell is activated according to each embodiment of the present invention is described. Although the following description is made with reference to an example in which a base station providing a small cell is different from a master base station, the present invention may also be applied when one base station provides a plurality of cells.

The terminal may receive information indicating whether an HNodeB is activated through a base station that the terminal is currently communicating with via a link.

Specifically, the information indicating whether the small cell is activated may be received using a DCI format. For example, the DCI format for transmitting the information indicating whether the HNodeB is activated may be DCI format 1C.

For example, the information indicating whether the HNodeB is activated may be received via a PCell of the terminal. Accordingly, the terminal may recognize whether the HNodeB is activated. If an HNodeB available for the terminal is activated, the terminal may perform communication by adding a radio resource of the HNodeB.

Also, the terminal may receive indication information indicating that a cell of a secondary base station is further activated in a situation where the master base station and the secondary base station are carrier-aggregated. In this case, the indication information may be received through any one of cells included in a secondary cell group.

The foregoing indication information may have 1 bit and include on/off information. In another embodiment, the indication information may also carry information on whether a radio resource of the HNodeB is available for the terminal. In still another embodiment, activation indication information may be transmitted only when the HNodeB is in the activated state, assuming that the HNodeB is always in the deactivated state. In this case, when no indication information is received, the terminal may determine that the HNodeB is in the deactivated state or there is no HNodeB.

Figure 8:
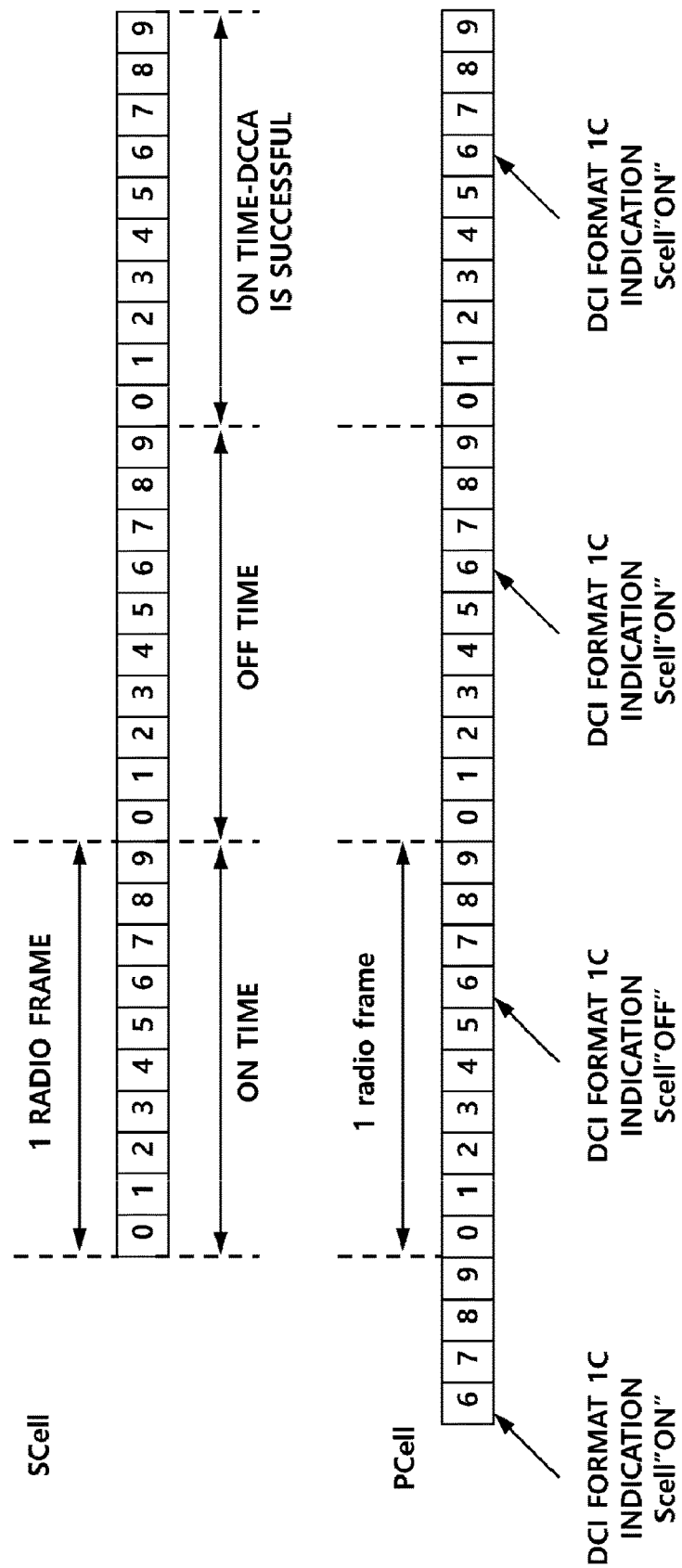
FIG. 8 illustrates an example of a relationship between subframes in which indication information is transmitted according to an embodiment of the present invention.

FIG. 8 illustrates an example of a relationship between subframes in which indication information is transmitted according to an embodiment of the present invention.

In a specific example in which indication information is transmitted, the indication information may include information on whether an HNodeB is activated in a next radio frame. For example, a terminal may receive the indication information in a subframe, which is k subframes before an nth subframe from which a second radio frame starts. For example, when k is 4, the indication information may be transmitted in a sixth subframe of a first radio frame. The indication information may indicate whether the HNodeB is activated in the second radio frame.

A base station may transmit indication information indicating activation even when the terminal establishes dual connectivity described above. For example, the base station may transmit the indication information using a higher-layer signal (RRC signal). In this case, the indication information may be transmitted through any one cell in a secondary cell group configured for the terminal. The cell via which the indication information is transmitted may perform a function of transmitting a PUCCH in the secondary cell group. In another embodiment, the indication information may be transmitted through any one cell in a primary cell group provided by a master base station.

Method for Changing State of Small-Cell Base Station

An HNodeB may also need to quickly change the state into the activated state when a terminal is present in small-cell coverage. For this reason, if there is a terminal in the coverage when the HNodeB is in the deactivated state, it is efficient for the HNodeB to switch to the activated state to provide a radio resource.

Particularly, if a plurality of signals is involved in performing a procedure for the HNodeB to switch to the activated state, a time delay may occur in processing data of the terminal. Thus, a procedure in which the HNodeB recognizes the terminal and quickly switches to the activated state is necessary.

First Embodiment

To this end, an HNodeB of the present invention may receive a small cell activation related signal from a terminal or a master base station.

For example, the master base station (NodeB) may indicate to the HNodeB whether a terminal is present. In this case, an interface (for example, interface Xn) between the NodeB and the HNodeB may be used. The HNodeB may receive, from the NodeB, information on the presence of a terminal or on the necessity for data transmission and reception through the HNodeB and may switch to the activated state.

For another example, the HNodeB may detect a signal transmitted from the terminal to identify the terminal. In this case, however, the HNodeB is in the deactivated state and thus needs to quickly recognize the terminal so as not to cause a synchronization problem. Thus, a PRACH may be used. Specifically, the terminal may transmit a PRACH, and the HNodeB may detect a PRACH sequence to identify the presence of the terminal. After identifying the presence of the terminal, the HNodeB may switch to the activated state. The terminal may transmit the PRACH when the NodeB that is in communication with the terminal instructs the terminal to transmit the PRACH. Here, information to instruct PRACH transmission may be transmitted through a PDCCH. The PRACH sequence relating to the activation of the small cell may be generated in a different form from that for a sequence generated for random access. In another embodiment, the PRACH for the activation of the HNodeB transmitted from the terminal may be distinguished from a PRACH for random access. For example, an identifier or index/distinguisher/indication information based on a sequence difference may be included in the PRACHs.

For still another example, the terminal may perform a random access procedure with the HNodeB using the PRACH signal transmitted to the HNodeB. Accordingly, the terminal may activate the HNodeB and perform a procedure for using a radio resource of the HNodeB at the same time. Therefore, a procedure for an operation of the terminal adding the radio resource may be reduced. Specifically, a method in which the terminal adds the radio resource of the HNodeB may be similar to a process of adding a wireless local area network (WLAN) resource. That is, the terminal may detect a discovery signal from the HNodeB and may activate the HNodeB using the PRACH signal or the like, simultaneously with adding the radio resource through the random access procedure.

For yet another example, a reference signal may be used to activate or deactivate the HNodeB. For example, the terminal may quickly change the activated state of the HNodeB using a CRS, CSI-RS, PRS, and the like. Further, in this case, the terminal may perform the same procedure using a command or indication information from the NodeB.

Figure 9:
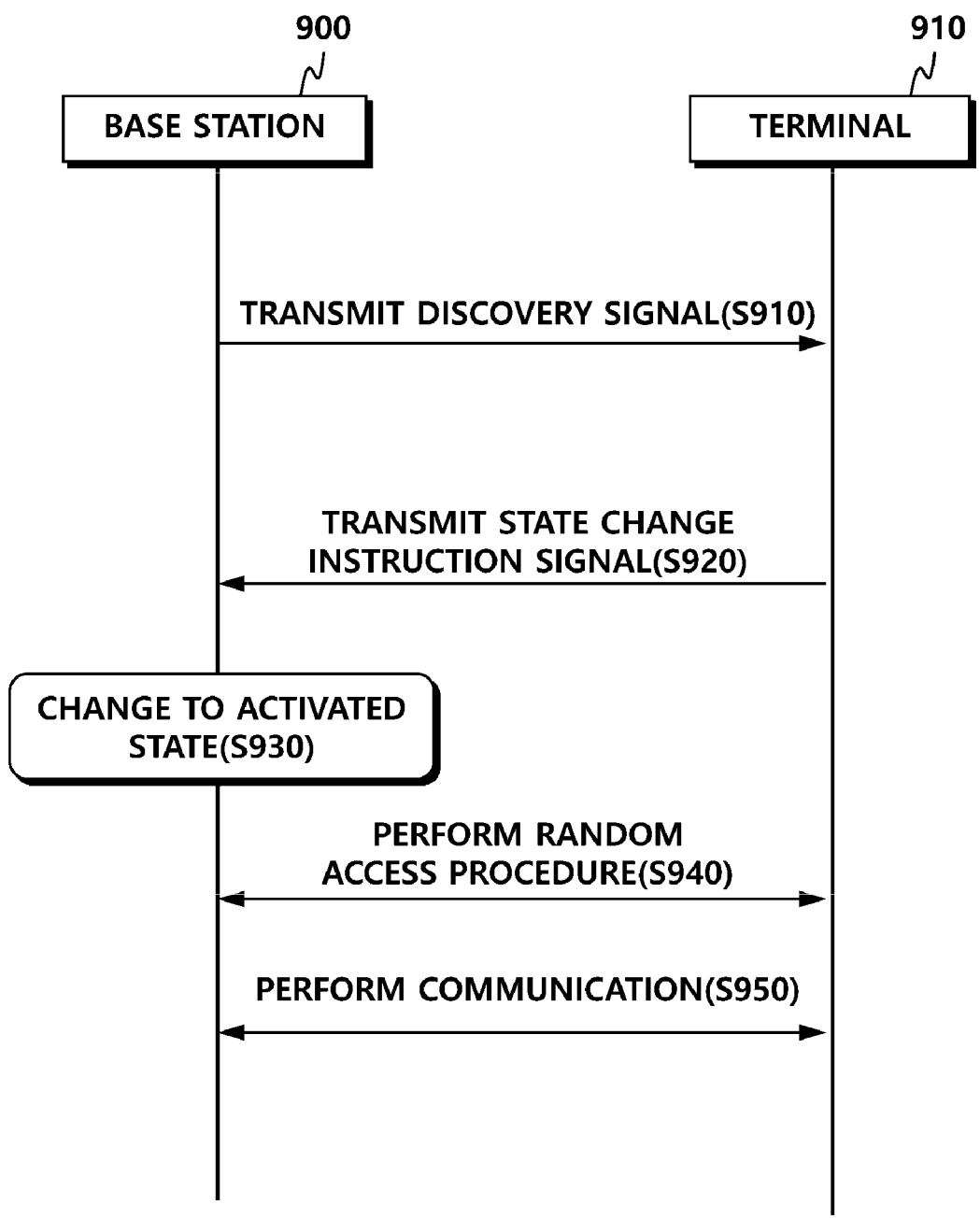
FIG. 9 is a signal diagram illustrating operations of a terminal and a base station according to one example of the foregoing methods of using a PRACH.

FIG. 9 is a signal diagram illustrating operations of a terminal and a base station according to one example of the methods of using the PRACH.

In FIG. 9, the terminal may activate an HNodeB and perform a random access procedure at the same time using a random access channel (PRACH). Accordingly, small cell activation time may be reduced. That is, the terminal may transmit the PRACH periodically or according to an instruction from a master base station even when the terminal is performing communication with the master base station. The HNodeB may detect the PRACH transmitted from the terminal to switch to the activated state and may provide the terminal with a radio resource.

Referring to FIG. 9, the HNodeB 900 transmits a discovery signal (S910). As described above, the discovery signal may be formed of a PRS or a PSS, SSS, and CRS. The terminal 910 receives the discovery signal to retrieve the HNodeB and transmits a state change instruction signal to change the state of the HNodeB 900 in the deactivated state in order to access the HNodeB (S920).

The HNodeB 900 switches from the deactivated state to the activated state based on the received state change instruction signal (S930). In another embodiment, the terminal 910 may receive a signal instructing transmission of the state change instruction signal from a NodeB and may transmit the state change instruction signal.

Meanwhile, the terminal 910 may transmit the state change instruction signal through the PRACH, and accordingly the HNodeB 900 may receive an instruction to switch to the activated state and may perform the random access procedure with the terminal 910 simultaneously (S940).

When the terminal 910 finishes the random access procedure with the HNodeB 900, the terminal 910 may perform communication (S950).

For another example, the HNodeB may receive a PRACH related parameter from a core network in order to receive a PRACH from the terminal. Thus, the HNodeB may determine whether the terminal is located in the coverage of the HNodeB, and may determine whether the PRACH is for access to a master base station or is for instructing activation. According to a method for identifying information for such determination, the PRACH may be determined based on the parameter received from the core network.

As described above, for a method of receiving state information on an HNodeB or transmitting a signal to change the state of the HNodeB, a procedure for discovering a small cell may be required.

For example, even when the HNodeB is in the deactivated state in order to reduce power consumption and interference, the terminal may need to identify the presence of the HNodeB through a discovery signal.

In this case, in a time division duplex (TDD) mode, inter-cell synchronization is needed, which is also needed likewise in TDD-frequency division duplex (FDD). Thus, a method for synchronization between a master base station (NodeB) and a secondary base station (HNodeB) is necessary for the aforementioned carrier aggregation, small cell technique, and dual connectivity. Synchronization may need to be performed between a macro cell and a small cell, between small cells in one small cell cluster, and between small cell clusters.

If the terminal in an RRC connected state is allowed to receive timing information on a small-cell discovery signal of the secondary base station from the master base station, the terminal may reduce time for timing search and waste of power consumption.

Implementation of Synchronization

According to the foregoing requirement, a terminal of the present invention may receive timing information for monitoring a discovery signal of an HNodeB or specific information to derive timing information for monitoring from a master base station or HNodeB.

Figure 10:
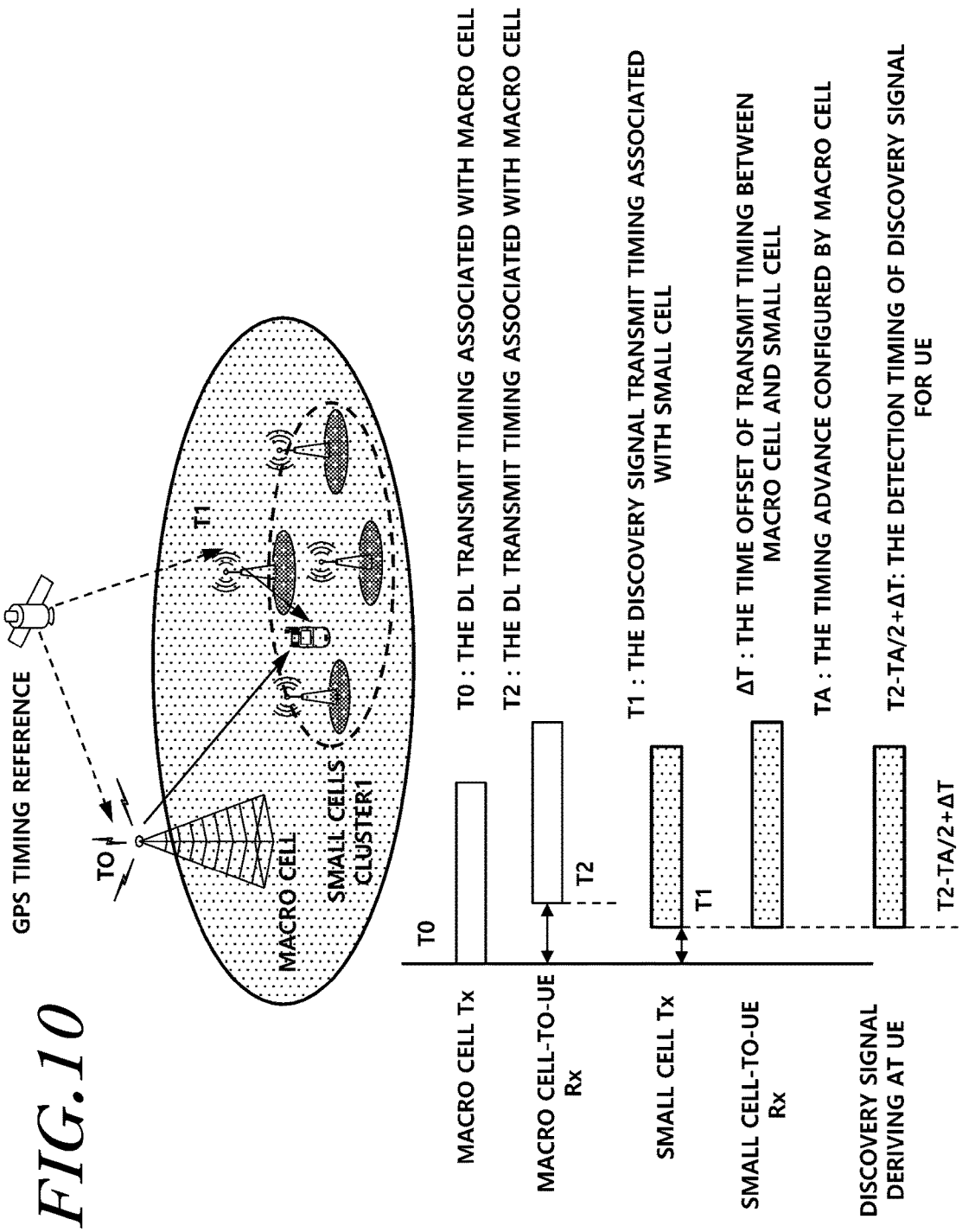
FIG. 10 illustrates an example of a scenario in which a terminal derives timing information on a small-cell discovery signal.

FIG. 10 illustrates an example of a scenario in which a terminal derives timing information on a small-cell discovery signal.

The terminal may derive the timing information on the small-cell discovery signal based on macro-cell timing information. For example, the terminal derives the timing information on the small-cell discovery signal based on a macro-cell reception timing. In this case, the derived value of the small-cell discovery signal may be rough information but may have an effect of reducing time for timing search and power consumption. Specifically, the terminal in the RRC connected state may communicate with the master base station. The terminal in the RRC connected state receives a macro-cell signal provided by the master base station. Due to the distance between the master base station and the terminal, there is a gap between a transmission timing (T0) at which the master base station transmits a downlink signal and a reception timing (T2) at which the terminal receives the downlink signal. The master base station and the secondary base station may synchronize with each other through a global positioning system (GPS)/global navigation satellite system (GNSS) or common source. The terminal may receive the discovery signal from the secondary base station. The terminal and the secondary base station are positioned relatively close as compared with the distance between the master base station and the terminal. Thus, a gap between a timing at which the secondary base station transmits the discovery signal and a timing at which the terminal receives the discovery signal may be assumed to be very short.

In this case, the terminal may derive the rough timing information on the small-cell discovery signal based on the timing information on the signal received from the master base station, information of a timing advance (TA), and $\Delta T$ that is an offset in signal transmission timing between the master base station and the secondary base station. For example, the rough timing of the discovery signal may be derived using equation $T2-TA/2+\Delta T$ illustrated in FIG. 10.

The terminal may receive at least one or more of the foregoing pieces of information for calculating the above equation from the master base station. For example, since the terminal is RRC-connected with the master base station, the terminal may receive T2 and TA from the master base station or calculate T2 and TA using parameters received from the master base station. Further, the terminal may receive $\Delta T$ from the master base station. Specifically, $\Delta T$ may be received through higher-layer signaling or be selected among preset values in the terminal based on indication information or parameter information received from the master base station.

For another example, the terminal may receive a signal including timing information for monitoring the discovery signal from the master base station. In this case, the terminal may monitor the discovery signal based on the timing information received from the master base station, thereby reducing monitoring time.

For still another example, the terminal may receive specific information necessary for calculating the timing information for monitoring the discovery signal. In this case, the terminal may derive a monitoring timing of the discovery signal based on the specific information.

In FIG. 10, the NodeB (master base station) and the HNodeB may synchronize with each other using positioning information through a satellite.

Figure 11:
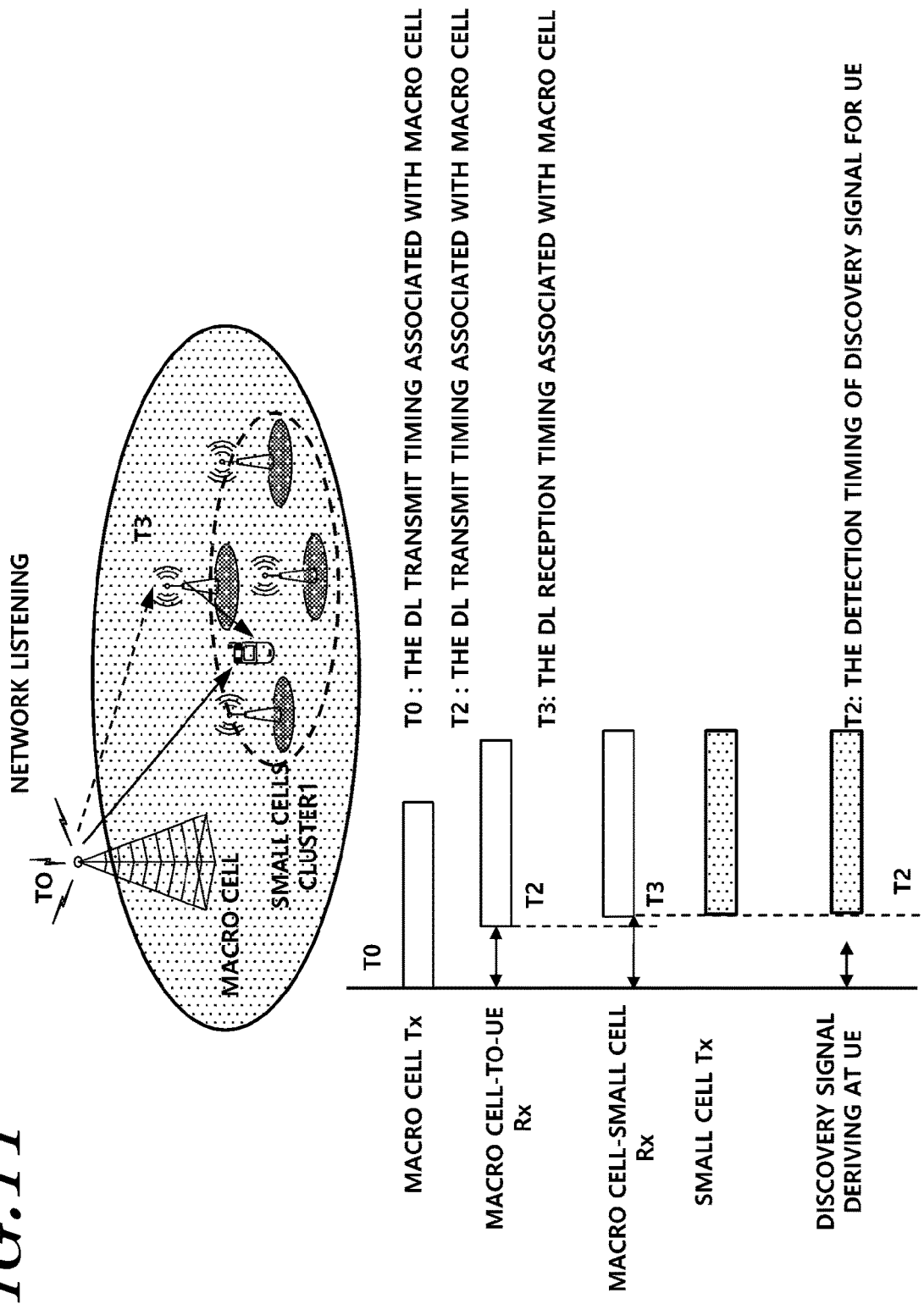
FIG. 11 illustrates another example of a scenario in which a terminal derives timing information on a small-cell discovery signal.

FIG. 11 illustrates another example of a scenario in which a terminal derives timing information on a small-cell discovery signal.

Unlike in the scenario of FIG. 10, a small cell may be deployed at a position where satellite positioning information (GPS/GNSS) is unavailable. For example, a small cell may be deployed in a shadow area, such as an indoor environment or a hot spot surrounded by tall buildings. In this case, the method illustrated in FIG. 10 makes it difficult to use the transmission timing information of the macro cell and the small cell through the same source.

Thus, in this case, the small cell may synchronize with a macro cell through network listening. For example, the small cell may maintain synchronization by monitoring a reference signal (CRS, CSI-RS, PRS, and the like) transmitted from a master base station.

Referring to FIG. 11, the secondary base station may transmit a discovery signal around a reception timing of a signal transmitted from the master base station. Since the distance between the terminal and the secondary base station is relatively much shorter than the distance between the master base station and the terminal, the terminal may search for the discovery signal based on the reception timing of the signal from the master base station. That is, the terminal may monitor the discovery signal based on the reception timing of the signal from the master base station and timing adjustment $\Delta T$.

For another example, the master base station may transmit, to the terminal, timing information for monitoring the discovery signal transmitted from the secondary base station.

For still another example, the master base station may transmit specific information necessary for calculating the timing information for monitoring the discovery signal. The terminal may derive a monitoring timing of the discovery signal based on the specific information.

Figure 12:
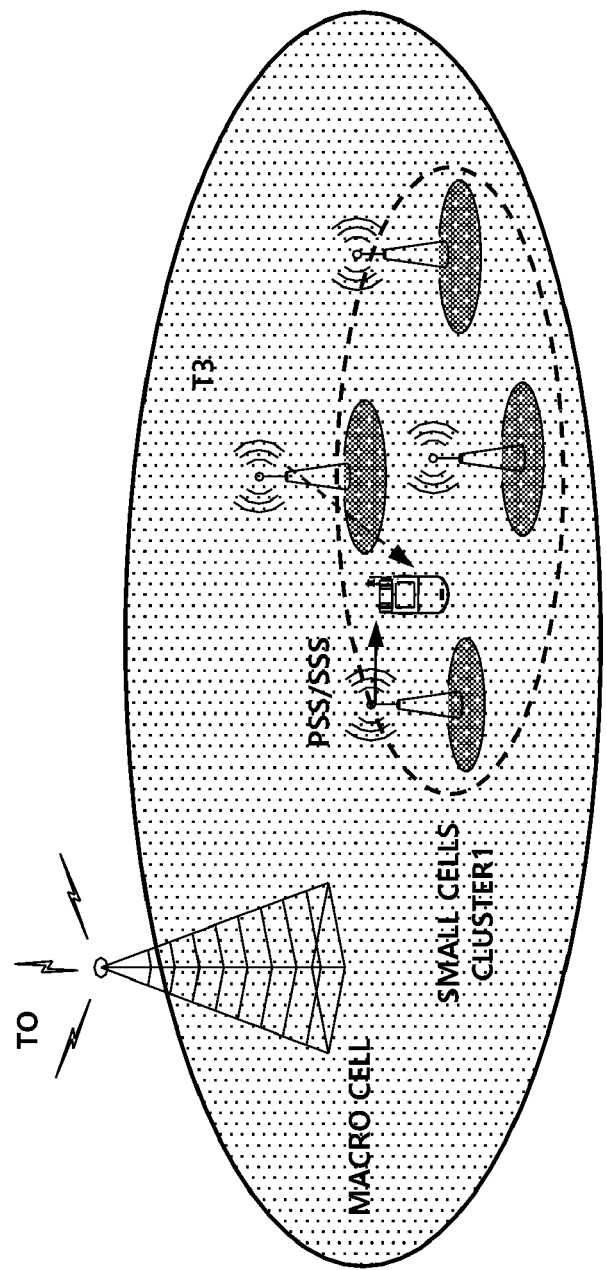
FIG. 12 illustrates still another example of a scenario in which a terminal derives timing information on a small-cell discovery signal.

FIG. 12 illustrates still another example of a scenario in which a terminal derives timing information on a small-cell discovery signal.

FIG. 12 illustrates an embodiment of a discovery signal search timing in a case of a small cell cluster where a plurality of secondary base stations are established. For example, a situation where the plurality of secondary base stations is deployed, the terminal may detect a PSS/SSS from a small cell transmitting a strong signal. In this case, the terminal may use the PSS/SSS as a timing reference for detecting a discovery signal from a small cell deployed in one small cell cluster. A network may indicate, to the terminal, a set of Physical-layer Cell Identities (PCIs) of PSSs/SSSs sharing the same timing as the same discovery set.

Thus, the terminal may derive a detection timing of the discovery signal based on a signal (for example, PSS/SSS) from a specific cell in the same small cell cluster.

When the terminal maintains RRC connection with the master base station, the terminal may receive information on the set of PCIs using the same PSS/SSS timing from the master base station. In another embodiment, the terminal may receive the strongest PSS/SSS and may transmit information on the signal to the master base station. The master base station may receive the information on the signal from the terminal and may transmit information on a PCI set using the same timing as a secondary base station associated with the signal. In still another embodiment, the information on the PCI set may be preset in the terminal.

For another example, the terminal may receive one or more of reference signals including a PSS, SSS, CRS, CSI-RS, and PRS in receiving the discovery signal from the secondary base station in the small cell cluster.

As described above, the terminal may use a signal from the master base station or a signal from some of the secondary base stations in order to derive the timing for the discovery signal from the secondary base station. The terminal may obtain rough timing information on the discovery signal from the specific secondary base station using the corresponding information, thereby reducing waste of power and time.

Further, the aforementioned method for the terminal to receive the information indicating whether the small cell is activated and each embodiment for quickly receiving the discovery signal may be performed in combination.

That is, the terminal may use a specific signal from the master base station or secondary base station in order to quickly receive the discovery signal, and the terminal, which has received the signal, may receive information on activation of the secondary base station.

For example, the terminal may receive information on a PCI set for the secondary base stations using the same PSS/SSS from the master base station and may detect a discovery signal from a secondary base station using the PCI set information. When the discovery signal from the secondary base station is detected, the terminal transmits, to the master base station, a signal including identification information to identify the discovery signal from the secondary base station. The terminal may receive PRACH related information from the master base station and may transmit a PRACH to change the secondary base station into the activated state based on the PRACH related information. Accordingly, the terminal may quickly detect the discovery signal from the secondary base station and may activate the secondary base station.

Figure 13:
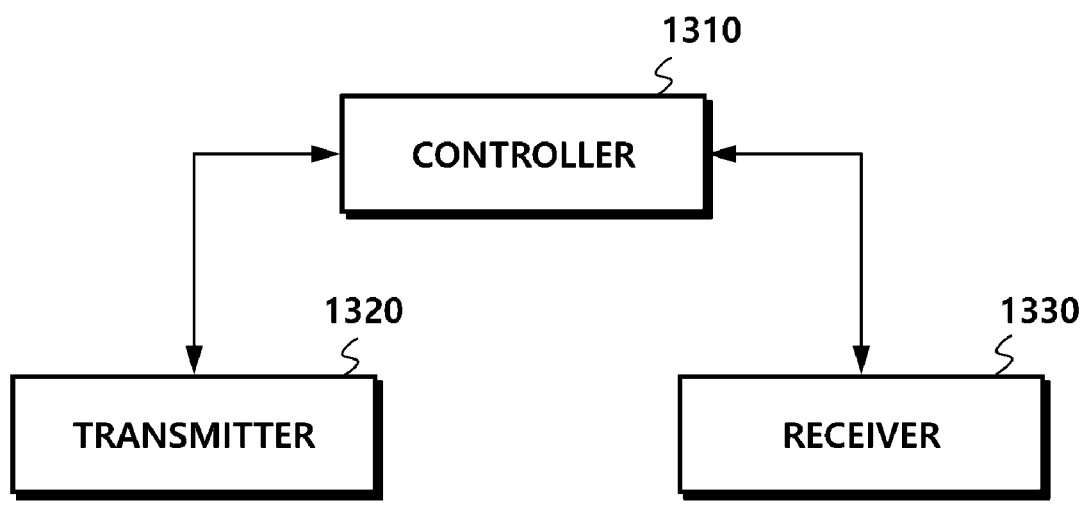
FIG. 13 illustrates a configuration of a base station according to another embodiment of the present invention.

FIG. 13 illustrates a configuration of a base station according to another embodiment of the present invention.

Referring to FIG. 13, the base station 1300 according to the embodiment of the present invention includes a controller 1310, a transmitter 1320, and a receiver 1330.

The controller 1310 controls overall operations of the base station for generating a discovery signal and changing the state of a small cell in order to implement the present invention described above.

Further, the controller 1310 may perform a switch to the activated state based on a state change instruction signal and may control to perform communication with a terminal through a random access procedure. In addition, the controller 1310 may control to perform each operation of the present invention described above.

The transmitter 1320 may transmit the discovery signal in the deactivated state.

The receiver 1330 may receive the state change instruction signal to change the deactivated state to the activated state.

In addition, the transmitter 1320 and the receiver 1330 are used to transmit/receive signals, messages, and data, which are necessary to perform the aforementioned present invention, to/from the terminal and a macro-cell base station.

Figure 14:
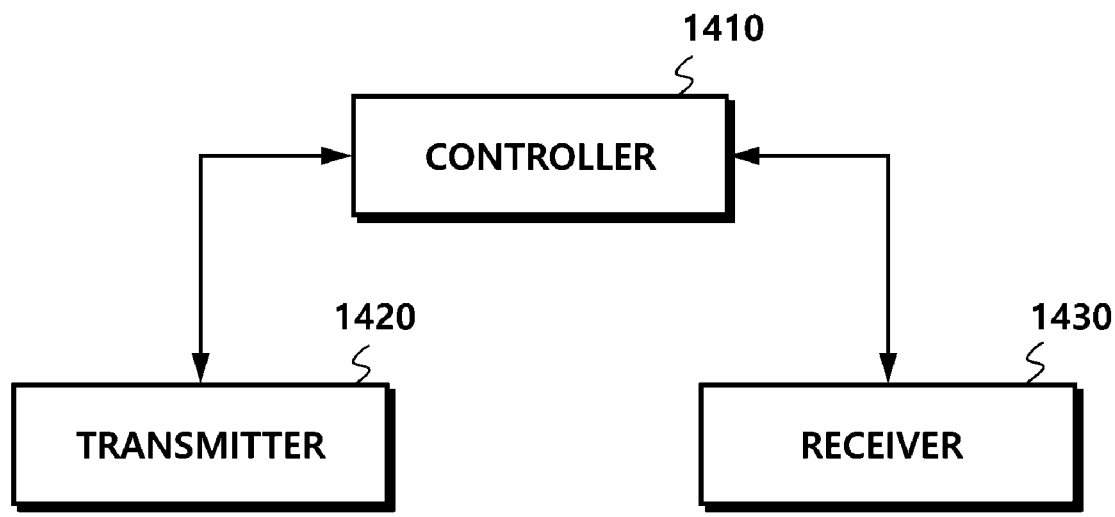
FIG. 14 illustrates a configuration of a user terminal according to another embodiment.

FIG. 14 illustrates a configuration of a user terminal according to another embodiment of the present invention.

Referring to FIG. 14, the user terminal 1400 according to the embodiment of the present invention includes a receiver 1430, a controller 1410, and a transmitter 1420.

The receiver 1430 receives downlink control information, data, and messages from a base station through a corresponding channel. Further, the receiver 1430 may receive a discovery signal from a small-cell base station and may receive a signal instructing the transmission of a small cell state change instruction signal from a macro-cell base station.

The controller 1410 controls the overall operations of the terminal according to the reception of the discovery signal and the generation and transmission of the state change instruction signal, which are needed to perform the aforementioned present invention.

Further, the controller 1410 controls the overall operations to perform a random access procedure with the small-cell base station and controls the generation of a random access channel including the state change instruction signal, which is distinguished from an existing random access channel.

The transmitter 1420 transmits uplink control information, data, and messages to the base station through a corresponding channel. Further, the transmitter 1420 may transmit the state change instruction signal and the random access channel to the small-cell base station.

In addition, the terminal may include a component to perform each operation for achieving the aforementioned present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, exemplary aspects of the present invention have not been described for limiting purposes. The scope of the present invention shall be construed on the basis of the accompanying claims in such a manner that all of the technical ideas included within the scope equivalent to the claims belong to the present invention.

CROSS-REFERENCE TO RELATED APPLICATION

This application is a National Stage of International Patent Application No. PCT/KR2015/000373, filed on Jan. 14, 2015, which claims priority under 35 U.S.C. § 119(a) to Patent Applications No. 10-2014-0005618 filed in Korea on Jan. 16, 2014, No. 10-2014-0007272 filed in Korea on Jan. 21, 2014, No. 10-2014-0034126 filed in Korea on Mar. 24, 2014, No. 10-2014-0177482 filed in Korea on Dec. 10, 2014 and No. 10-2014-0177488 filed in Korea on Dec. 10, 2014, the entire contents of which are hereby incorporated by reference. In addition, this application claims priority in countries, other than the U.S., with the same reason based on the Korean Patent Application, the entire contents of which are hereby incorporated by reference.

The invention claimed is:

1. A method of changing a state by a small cell base station, the method comprising:
periodically transmitting a discovery signal in a deactivated state;
receiving a state change instruction signal to change from the deactivated state to an activated state; and changing to the activated state based on the state change instruction signal,
wherein the discovery signal is comprised of a unique cell identifier information,
wherein the state change instruction signal is received from a macro-cell base station,
wherein a terminal establishes dual connectivity with the macro-cell base station and the small-cell base station in an activated state,
wherein the terminal communicates through a specific radio bearer that is configured to be split for the macro-cell base station and the small-cell base station,
wherein the terminal receives an indication information indicating the state of the small-cell base station,
wherein the indication information has one (1) bit and includes on/off information, and
wherein the terminal receives the indication information via a Primary Cell (PCell) of the macro-cell base station.

2. A small cell base station that changes a state, the small cell base station comprising:
a transmitter configured to periodically transmit a discovery signal in a deactivated state;
a receiver configured to receive a state change instruction signal to change from the deactivated state to an activated state; and
a controller configured to change to the activated state based on the state change instruction signal,
wherein the discovery signal is comprised of a unique cell identifier information,
wherein the state change instruction signal is received from a macro-cell base station,
wherein a terminal establishes dual connectivity with the macro-cell base station and the small-cell base station in an activated state,
wherein the terminal communicates through a specific radio bearer that is configured to be split for the macro-cell base station and the small-cell base station,
wherein the terminal receives an indication information indicating the state of the small-cell base station,
wherein the indication information has one (1) bit and includes on/off information, and
wherein the terminal receives the indication information via a Primary Cell (PCell) of the macro-cell base station.

* * * * *